United States Patent

[11] 3,551,774

| [72] | Inventor | Philip H. Rusch<br>Wauwatosa, Wis. |
|---|---|---|
| [21] | Appl. No. | 813,535 |
| [22] | Filed | Apr. 4, 1969 |
| [45] | Patented | Dec. 29, 1970 |
| [73] | Assignee | Square D Company<br>Park Ridge, Ill.<br>a corporation of Michigan |

[54] CURRENT LIMITING CIRCUIT FOR A SOLID STATE D. C. MOTOR CONTROL CIRCUIT
5 Claims, 2 Drawing Figs.

[52] U.S. Cl. .................................................. 318/341,
   318/139, 318/434; 317/50
[51] Int. Cl. ................................................. H02p 5/16
[50] Field of Search ............................................ 317/50;
   318/329, 345, 341, 139, 434

[56] References Cited
UNITED STATES PATENTS

| 3,358,206 | 12/1967 | Thiele ........................... | 318/345 |
| 3,361,921 | 1/1968 | Montross ...................... | 318/139 |
| 3,387,205 | 6/1968 | Tesdall ......................... | 318/434 |
| 3,439,247 | 4/1969 | Palmer ........................ | 318/345 |
| 3,446,992 | 5/1969 | Webb ........................... | 318/345 |

Primary Examiner—Oris L. Rader
Assistant Examiner—Thomas Langer
Attorneys—Harold J. Rathbun and William H. Schmeling ABSTRACT: A current limiting circuit for a solid state DC motor control circuit wherein the energizing current to the motor is controlled by a silicon controlled rectifier that is intermittently switched to a conductive state so that the motor is supplied with pulses of direct current. The current limiting circuit is controlled by a means that is responsive to the temperature of the rectifier as the rectifier is heated by the current pulses and a means that is responsive to the height of voltage spikes which appear at the anode of the rectifier when the rectifier is switched to a nonconductive state. The height of the voltage spikes are proportional to the current flow through the motor. The current limiting circuit responds to the height of the voltage spikes and the temperature of the rectifier and causes the solid state circuit to progressively decrease the duration of the current pulses in response to a progressive increase in the current flow and the temperature of the rectifier.

3,551,774

INVENTOR.
PHILIP H. RUSCH
BY
William H. Schmeling

CURRENT LIMITING CIRCUIT FOR A SOLID STATE D. C. MOTOR CONTROL CIRCUIT

The present invention relates to a circuit for controlling the energization of a direct current load from a direct current source, and more particularly, to a circuit for protecting a silicon controlled rectifier against damage from excessive currents or temperatures in a circuit that controls the acceleration and speed of a reversible direct current motor as may be used as a prime mover for a battery powered vehicle.

Circuits of the type disclosed in U.S. Pat. No. 3,361,921 which was granted to Robert C. Montross and John P. Cooper, are frequently installed in industrial type electric trucks to control the energization of the direct current traction motor of the truck. As disclosed in the Montross et al. patent, a first silicon controlled rectifier connected in series with the motor is intermittently switched to a conductive state so that the motor is energized by pulses of direct current having a controlled duration. The first silicon controlled rectifier is commutated from a conducting state to a nonconducting state by a commutating circuit that includes a capacitor which is charged during the interval the first silicon controlled rectifier is conducting and a second silicon controlled rectifier that is switched to a conductive state an adjustable time interval subsequent to the instant when the first rectifier is switched to a conductive state.

It is to be appreciated that under certain operating conditions, such as during periods when the motor is energized while the vehicle is stalled or the vehicle is fully loaded and is required to climb an incline, the back emf of the motor will decrease. Economical design of the control system dictates that the controlled rectifiers be selected to be capable of operating under normal operating conditions of the vehicle and not under conditions when the motor current is excessive as caused by the reduced back emf of the motor. The current limiting circuit as hereinafter described will protect the first silicon controlled rectifier from damage resulting from excessive currents by reducing the conducting intervals of the first rectifier when the temperature or the current flow through the first rectifier exceeds a predetermined value.

It is an object of the present invention to provide a solid state DC motor control circuit with a means which will decrease the duration of the conduction periods of a silicon controlled rectifier when the temperature and current through the rectifier exceeds a predetermined value.

Another object is to protect a silicon controlled rectifier from damaged in a solid state DC motor control circuit by reducing the conducting periods of the rectifier when the current flow or the operating temperature of the rectifier exceeds a predetermined value.

An additional object is to detect the height of a voltage spike which appears at the anode of a silicon controlled rectifier in a solid state DC motor control circuit when the rectifier is commutated from a conducting to a nonconducting state to supply the motor with controlled duration pulses of direct current and also to detect the operating temperature of the rectifier as the rectifier is heated by the current pulses and to progressively reduce the duration of the current pulses as the height of the voltage spikes and the temperature of the rectifier progressively exceed a predetermined value.

Further objects and features of the invention will be readily apparent to those skilled in the art from the specification and appended drawing illustrating certain preferred embodiments in which.

Figure 1:
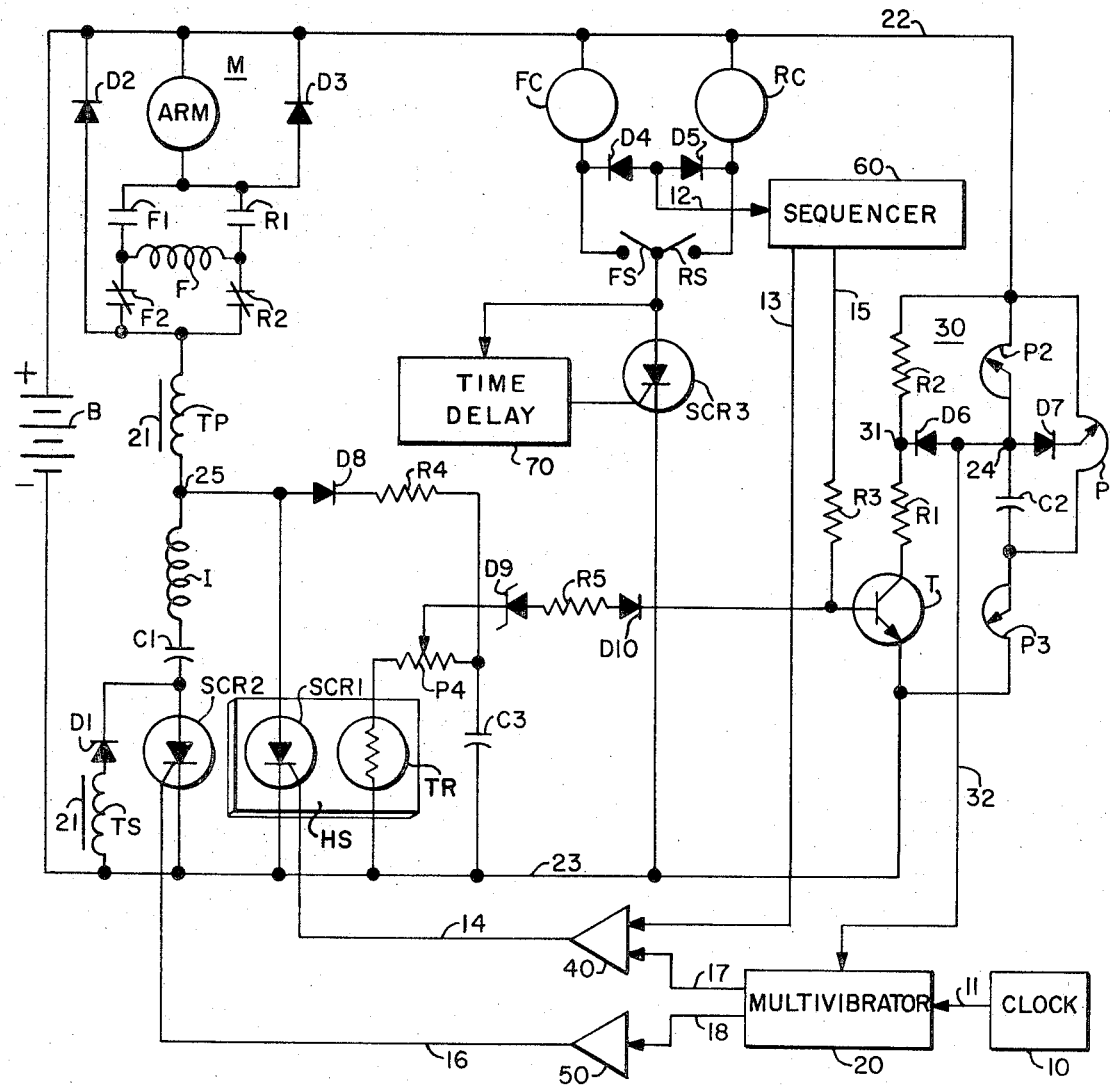
FIG. 1 is a schematic diagram showing a motor control circuit incorporating the features of the present invention.

The circuit shown in FIG. 1 is particularly suited for controlling the energization of a series wound direct current motor M which serves as a prime mover for a vehicle having a directional and speed control master switch, not shown, which individually operates a pair of switch contacts FS and RS, as well as a slider on an adjustable resistor P. The contacts FS and RS control the energization of a pair of coil windings FC and RC which control the operation of two pairs of contacts F1 F2 and R1 R2 in a conventional reversing circuit for the motor M. During standby conditions, that is, prior to the operation of SCR-2 master switch, a clock 10 provides signal pulses at a constant frequency through a lead 11 to a single shot type multivibrator circuit 20. The multivibrator circuit 20 is controlled by the input signals from the clock as well as a signal from a speed and acceleration control circuit 30 and supplies input signals to a pair of amplifiers 40 and 50 which in turn have outputs respectively providing firing current pulses to the gates of a pair of silicon controlled rectifiers SCR-1 and ACR-2 to switch the rectifiers SCR-1 and SCR-2 into conductive states. Further, during standby conditions, as the contacts F1, R1, FS and RS are open, the following conditions prevail within the circuit. The open contacts F1 and R1 prevent an armature winding ARM and a field winding F of the motor M from being energized and the rectifiers SCR-1 and SCR-2 from conducting. The open contacts FS and RS prevent the coil windings FC and RC from being energized and a silicon controlled rectifier SCR-3 from conducting. The open contacts FS and RS also cause a control signal to be supplied through a lead 12 to a circuit within a sequencer 60 so that the sequencer 60 supplies a blocking signal through a lead 13 to the amplifier 40 which prevents firing signals from appearing at a lead 14 which would switch the rectifier SCR-1 to a conductive state.

The armature ARM is caused to rotate in either the forward or reverse direction by the selective operation of the switch contacts FS or RS which are controlled by the master switch. Assuming the switching contacts FS are closed so the motor M will operate in a forward direction, the following conditions will prevail. The switch contacts FS when closed complete a circuit through a coil winding FC to the anode of the rectifier SCR-3 and an energizing circuit to a time delay circuit 70 which, after a fixed time delay, e.g., 50milliseconds, supplies a signal to the gate of the rectifier SCR-3 which causes the rectifier SCR-3 to switch to a conductive state and become latched in a conductive state as it is connected across a direct current supply as provided by a battery B. The delay provided by the time delay circuit 70 is included to assure that the coil FC is deenergized and the coil RC is energized and vice versa, in event a plugging operation of the circuit is desired. The conducting rectifier SCR-3 and the closed switch contacts FS cause the coil winding FC to be energized and the normally open contacts F1 to close and the normally closed contact F2 to open so that a circuit through the armature ARM and field winding F is completed to operate the motor M in a forward direction. Further, the conducting rectifier SCR-3 causes the removal of a control signal through the lead 12 to the sequencer 60 which, after a time delay, e.g., 100 milliseconds, removes the blocking signal through the lead 13 to the amplifier 40 so that the output of the amplifier 40 is controlled exclusively by the signals from the multivibrator 20. Additionally, the removal of the control signal via lead 12 causes the sequencer 60 to remove blocking signals to the control circuit 30 via a lead 15. The delay provided by the sequencer 60 eliminates the effects of contact bounce of the contact F1 and R1 on the remainder of the circuits and assures that after the contacts F1 or R1 are closed, firing signals will be supplied to the rectifier SCR-2 before the amplifier 50 supplies a firing pulse to the rectifier SCR-1.

The removal of the signal via the lead 15 permits the control 30 to supply a control signal voltage through a lead 32 which will control the energization of the motor M is response to the adjustment of the speed controlling adjustable resistor P. The control 30 provides a controlled voltage signal through the lead 32 which will cause the motor M to initially rotate at an adjustable minimum creep speed which increases at a substantially linear adjustable rate to a value determined by the adjustment of the adjustable resistor P. The multivibrator 20 is arranged to automatically switch to an OFF state and be switched to an ON state in response to a signal from the clock 10. The output signal from the control 30 determines the time interval required for the multivibrator 20 to automatically switch to an OFF state after it has been switched to an ON state. When the multivibrator 20 switches to an ON state it supplies a signal through a lead 17 which causes the amplifier 40 to supply a signal through the lead 14 to the gate of the rectifier SCR–1 which switches the rectifier SCR–1 into a conductive state. Similarly, when the multivibrator 20 switches to an OFF state, it supplies a signal through a lead 18 which causes the amplifier 50 to supply a signal through a lead 16 to the gate electrode of the rectifier SCR–2 which switches the rectifier SCR–2 into a conductive state.

The switching of the rectifier SCR–1 to a conductive state completes an energizing circuit for the armature ARM and the field F from the battery B which includes a lead 22, the armature ARM, the closed contacts F1, the field F, the closed contacts R2, a primary winding TP of a transformer 21, the conducting controlled rectifier SCR–1 and a lead 23. The controlled rectifier SCR–1 remains conducting after the firing signal to its gate electrode is removed as it is connected across a direct current source supplied by the battery B. A secondary winding TS of the transformer 21, in response to the current flow in the primary winding TP, provides an output current which is conducted by a diode D1 in a direction to charge a capacitor C1 making the side of the capacitor C1 which is connected to the anode of the rectifier SCR–2 positive in polarity. The charging current path for the capacitor C1 includes an inductor I and the conducting controlled rectifier SCR–1. The output of the transformer secondary winding TS ceases when the iron core of the transformer 21 saturates. A short time interval after the rectifier SCR–1 has switched to a conductive state, the multivibrator 20 switches to an OFF state and supplies a signal through the lead 18 which causes the amplifier 50 to supply a signal through the lead 16 which causes the rectifier SCR–2 to switch to a conductive state.

The conducting rectifier SCR–2 completes a discharge path for the capacitor C1 which discharges through the rectifier SCR–2 and causes the rectifier SCR–1 to switch to a nonconductive state. After the rectifier SCR–1 to switched to a nonconducting state, any charge remaining on the capacitor C1 is discharged through the energizing circuit for the armature ARM and field F. The clock 10 and the speed and acceleration control 30 are arranged to supply input signals to the multivibrator 20 which will cause the multivibrator to periodically switch to an ON state at a constant frequency and to switch from an ON state to an OFF state an adjustable time interval after it has switched to an ON state. Thus the motor field F and the armature ARM windings will be energized by pulses of current of varying width dependent upon the output signal from the control 30.

The circuit also includes a plurality of diodes D2, D3, D4 and D5. The diode D2 conducts during the interval between the pulses of current to the motor M because of the inductive nature of the armature and the field windings of the motor. The diode D3 conducts during plugging operation of the motor M when the motor acts as a generator. The diodes D4 and D5 prevent the coil windings FC and RC from being energized when the respective switches RS and FS are closed.

The speed and acceleration control 30 as shown in the drawing includes a transistor T, resistors R1 and R2, a capacitor C2, a pair of diodes D6 and D7, a pair of potentiometer resistors P2 and P3, and the adjustable resistor P. The potentiometer resistor P2 determines the rate at which the motor M will accelerate the potentiometer resistor P3 determines the minimum speed of the motor M and the adjustable resistor P controls the duration of the conducting intervals of the rectifier SCR–1 and thus acts as a speed control for the circuit. The capacitor C2 has a first side connected through the potentiometer P2 and the lead 22 to a positive polarity terminal of the battery B and a second side connected through the potentiometer P3 and the lead 23 to a negative polarity terminal of the battery B. The adjustable resistor P has a slider connected through the diode D7 to a junction 24 located between the capacitor C2 and the potentiometer P2, and its resistance portion connected in a parallel circuit with the potentiometer P2 and the capacitor C2.

The transistor T has an emitter electrode connected through the lead 23 to the negative polarity terminal of the battery B and a collector electrode connected through the resistors R1 and R2 and the lead 22 to the positive polarity terminal of the battery. The junction 24 is connected through the diode D6 to a junction 31 located between the resistors R1 and R2. The diodes D6 and D7 respectively are poled to conduct current from the junction 24 to the junction 31 and the slider of the adjustable resistor P and block current in the reverse direction. The lead 32 is connected to the junction 24 so that the voltage across the capacitor C2 in series with voltage across potentiometer P3 is supplied as an input signal to the circuitry within multivibrator 20. The circuitry within the multivibrator is arranged so that a decreased positive potential at the junction 24 will cause a decrease in the time interval between an ON pulse on lead 17 and an OFF pulse on the lead 18. Thus as the voltage on the capacitor C2 is progressively increased, the time duration of the conducting periods of the rectifier SCR–1 will be progressively increased. The transistor T has a base electrode connected through a resistor R3 and the lead 15 to receive an input signal from the sequencer 60 which will bias the transistor T into saturation. The saturated transistor T provides a discharge path for the capacitor C2 and causes the capacitor to discharge and the potential at the junction 24 to be determined by the adjustment of the potentiometer P3. The discharge path through the transistor T includes the diode D6, the resistor R1 and the collector to emitter electrodes of the transistor T. When the transistor T is nonconducting, the voltage across the capacitor C2 is governed by the position of the slider on the adjustable resistor P and if the voltage across the capacitor C2 exceeds the value required by the position of the slider on the adjustable resistor P, the charge on the capacitor C2 will be discharged through the diode D7. When the voltage across the capacitor C2 is less than the value required by the position of the slider on the adjustable resistor P, the capacitor C2 will be charged through the potentiometer P2 at a rate determined by the adjustment of the potentiometer P2.

The control system includes a means which will decrease the duration of the conducting intervals of the rectifier SCR–1 when the current flow through the rectifier SCR–1 or the temperature of the rectifier SCR–1 exceeds a predetermined value as when the motor M is energized under stalled rotor conditions or the vehicle which is driven by the motor M is operating under a heavy load and ascending an incline so the back emf of the motor is reduced. The circuit for decreasing the conducting intervals of the rectifier SCR–1 when the current flow through the rectifier exceeds a value which would cause destruction or progressive deterioration of the rectifier SCR–1 includes a junction 25, a diode D8, a resistor R4, a capacitor C3, a potentiometer resistor P4, a Zener diode D9, a resistor R5, a diode D10, and thermistor type resistor TR. The thermistor TR and the rectifier SCR–1 are mounted on the same heat sink so that the thermistor TR will be subjected to and continuously detect the operating temperature of the rectifier SCR–1.

The junction 25 is located between the primary winding TP and the inductance I and is essentially connected to the anode of the rectifier SCR–1 so that the junction 25 and the lead 22 will be at the same positive potential when the rectifier SCR–1 is nonconducting. The cathode of the rectifier SCR–1 is directly connected through the lead 23 to the negative terminal of the battery B. Thus when the rectifier SCR–1 is conducting, the potential of the junction 25 will drop to a value approximate the potential of the lead 23.

Figure 2:
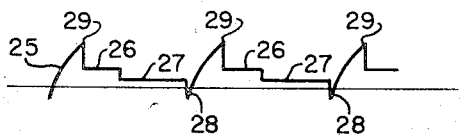
FIG. 2 is a curve showing the wave form of a signal at a junction 25 in the circuit in FIG. 1.

The rectifier SCR–1 is switched to a nonconductive state by the charge stored in capacitor C1 when the rectifier SCR–2 switches to a conductive state. After the rectifier SCR–1 is switched to a nonconductive state, the charge remaining on the capacitor C1 is discharged and reversed through the conducting rectifier SCR–2 and the circuit including the battery B and the motor M field and armature ARM. The circuit between the battery and the motor M includes an appreciable inductance, e.g., the leads between the battery B and the motor M as well as the winding TP, so that each time the rectifier SCR–1 switches to a nonconductive state, a momentary induced positive voltage increase or spike appears at the junction 25, which exceeds the positive potential of the battery by a value dependent on amount of current flow in the circuit at the instant the rectifier SCR–1 is switched from a conductive to a nonconductive state. The curve designated as 25 in FIG. 2 illustrates the potential at the junction 25 as the rectifier SCR–1 is switched from a conducting to a nonconducting state and vice versa, wherein time is indicated by the abscissa of the curve and the ordinate indicates a positive and negative voltage at the junction 25. The portions of the curve designated by the numerals 27 and 26 respectively illustrate the potential at the junction 25 when the rectifier SCR–1 is conducting and nonconducting. As was previously pointed out, the charge stored in capacitor C1 causes the rectifier SCR–1 to be commutated from a conducting to a nonconducting state. Thus during the brief instant when the rectifier SCR–1 is initially switching from a conductive to a nonconductive state, the potential at the junction 25 will become slightly negative as indicated by the portions 28 and then appear as a positive voltage spike 29. The height of the voltage spike 29 is proportional to the current flow through the rectifier SCR–1 during its previous conducting period. The voltage spikes 29 cause the capacitor C3 to be charged through a circuit which includes the diode D8 and the resistor R4. The capacitor C2 and its charging circuit is selected to have a short charge time constant. The potentiometer resistor P4 and the thermistor TR are connected across the capacitor C3 as a voltage divider network and have a long time constant compared to the charging circuit for the capacitor C3 so that a portion of the voltage across the capacitor C3 as dictated by the peak values of the voltage at the junction 25 appears as a positive potential at the slider of the potentiometer resistor P4. When the voltage across the capacitor C3 reaches a value dictated by the adjustment of the slider on the potentiometer resistor P4, the Zener diode D9 will break down and permit current to flow through the resistor R5 and the diode D10 to the gate electrode of the transistor T which biases the transistor into conduction. As previously described, the conducting transistor T provides a controlled discharge path for the charge on the capacitor C2 and thereby controls the positive potential at the junction 24. The duration of the conducting periods of the rectifier SCR–1 is controlled by the positive potential at the junction 24. Thus as the positive potential at the slider of the potentiometer resistor P is progressively increased, the conducting intervals of the rectifier SCR–1 will remain substantially constant after the current flow through the rectifier SCR–1 exceeds a predetermined value.

The temperature of the rectifier SCR–1 is dependent upon its ambient temperature and the current flow through the rectifier SCR–1. Thus as the ambient temperature and/or current flow is increased, the temperature of the rectifier SCR–1 increases. The thermistor TR and the rectifier SCR–1 are mounted on a common heat sink HS. Thus any increase or decrease in the operating temperature of the rectifier SCR–1 will cause a change in the temperature of the thermistor TR. The resistance of the thermistor is relatively constant at low temperatures and increases with a temperature increase. Thus an increase in the operating temperature of the rectifier SCR–1 will cause the increase in the resistance of the thermistor TR and an increase in the positive potential at the slider of the potentiometer resistor P4 for any given voltage across the capacitor C3. Thus an increase in the operating temperature of the thermistor TR will cause the transistor T to be biased into conduction and cause the conducting intervals of the rectifier SCR–1 to be reduced in the same manner as an increase in the voltage spikes at the junction 25 caused a reduction in the conducting intervals of the rectifier SCR–1.

The control circuit including the thermistor TR and the circuit which detects the height of the voltage spikes at the junction 25 thus detects both the temperature of the rectifier SCR–1 and the current flow therethrough and provides an output signal which will cause the rectifier SCR–1 to conduct values of current which are commensurate with its operating temperature and within its capabilities.

The constructional details of the time delay circuit 70 and the sequencer 60 will be readily understood by those skilled in the art. However, if further understanding thereof is required, the details thereof are clearly set forth in an application Ser. No. 813,520, which was filed by the inventors Philip H. Rusch and Roger D Meier concurrently herewith.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

I claim:

1. A circuit for controlling the energization of a direct current motor from a direct current source comprising: a pair of silicon controlled rectifiers, means for intermittently rendering the first of said pair of rectifiers conductive, means for rendering the second of said pair of rectifiers conductive an adjustable time interval after the first rectifier is rendered conductive, a capacitor, circuit means for charging the capacitor during conducting intervals of the first rectifier, circuit means including the capacitor, the first rectifier and the second rectifier for switching the first rectifier to a nonconductive state and causing a voltage spike to appear at the anode of the first rectifier when the second rectifier is rendered conductive, said voltage spike having a height proportional to the current flow through the first rectifier from the source and means responsive to the height of the spike and the temperature of the first rectifier for decreasing the duration of the conduction intervals of the first rectifier when the current flow through the motor and the temperature of the first rectifier exceeds a predetermined value.

2. The circuit as recited in claim 1 wherein the means responsive to the temperature of the first rectifier includes a thermistor.

3. The circuit as recited in claim 2 wherein the thermistor and the first rectifier are mounted on a common heat sink.

4. The circuit as recited in claim 3 wherein the means for detecting the height of the voltage spikes includes a capacitor that is connected in a circuit with the thermistor.

5. The circuit as recited in claim 4 wherein the circuit includes an adjustable resistor connected between the capacitor and the thermistor.

PO-1050
(5/69)

UNITED STATES PATENT OFFICE
CERTIFICATE OF CORRECTION

Patent No. 3,551,774      Dated December 29, 1970

Inventor(s) Philip H. Rusch

It is certified that error appears in the above-identified patent and that said Letters Patent are hereby corrected as shown below:

Col. 1, line 47, cancel "damaged" and insert --damage--.
Col. 2, line 2, cancel "F1F2 and R1R2" and insert --F1-F2 and R1-R2--; line 4, cancel "SCR-2"; line 7, after "clock" inse --10--; line 12, cancel "ACR-2" and insert --SCR-2--. Col. line 39 cancel "to" (first occurrence) and insert --is--.

Signed and sealed this 27th day of April 1971.

(SEAL)
Attest:

EDWARD M. FLETCHER, JR.
Attesting Officer

WILLIAM E. SCHUYLER, JR.
Commissioner of Patents